United States Patent
Shi et al.

(10) Patent No.: US 12,479,774 B2
(45) Date of Patent: Nov. 25, 2025

(54) ALUMINUM BORATE WHISKER REINFORCED AND TOUGHENED NON-METALLIC MATRIX COMPOSITE

(71) Applicants: Chongqing University of Science and Technology, Chongqing (CN); Chongqing Stio Measurement & Control Tech Co., Ltd, Chongqing (CN)

(72) Inventors: Yue Shi, Chongqing (CN); Bi Jia, Chongqing (CN); Jinliang Shi, Chongqing (CN); Zhigang Zou, Chongqing (CN); Yong Zhou, Chongqing (CN); Yongjiang Di, Chongqing (CN); Yin Liu, Chongqing (CN); Huichao He, Chongqing (CN); Rong Wang, Chongqing (CN); Xueyi Wang, Chongqing (CN); Hao Tian, Chongqing (CN); Jun Zhu, Chongqing (CN); Rui Tang, Chongqing (CN); Xingyu Chen, Chongqing (CN); Danxia Zhang, Chongqing (CN)

(73) Assignees: Chongqing University of Science and Technology, Chongqing (CN); Chongqing Stio Measurement & Control Tech Co., Ltd, Chongqing (CN)

( * ) Notice: Subject to any disclaimer, the term of this patent is extended or adjusted under 35 U.S.C. 154(b) by 12 days.

(21) Appl. No.: 18/502,532

(22) Filed: Nov. 6, 2023

(65) Prior Publication Data

US 2024/0067782 A1 Feb. 29, 2024

Related U.S. Application Data

(62) Division of application No. 17/847,386, filed on Jun. 23, 2022, now Pat. No. 11,999,831.

(30) Foreign Application Priority Data

Jun. 23, 2021 (CN) .......................... 202110701385.4

(51) Int. Cl.
  C04B 35/626 (2006.01)
  C04B 35/117 (2006.01)
  (Continued)

(52) U.S. Cl.
  CPC ............ C04B 35/80 (2013.01); C04B 35/117 (2013.01); C04B 35/6261 (2013.01);
  (Continued)

(58) Field of Classification Search
  CPC ...................................................... C04B 35/80
  See application file for complete search history.

(56) References Cited

U.S. PATENT DOCUMENTS

| | | | | |
|---|---|---|---|---|
| 4,917,941 A | * | 4/1990 | Hillig | .................... C04B 35/553 |
| | | | | 442/393 |
| 2005/0183839 A1 | * | 8/2005 | Fujita | ..................... C22C 47/06 |
| | | | | 164/98 |

FOREIGN PATENT DOCUMENTS

| CN | 1210117 A | * | 3/1999 |
|---|---|---|---|
| CN | 111848179 A | | 10/2020 |

(Continued)

*Primary Examiner* — Susan D Leong
*Assistant Examiner* — Timothy G Hemingway
(74) *Attorney, Agent, or Firm* — Wood Herron & Evans LLP

(57) ABSTRACT

An aluminum borate whisker reinforced and toughened non-metallic matrix composite is provided, which specifically includes a non-metallic material reinforced and toughened with aluminum borate whiskers. The composite exhibits a higher bending strength and fracture toughness and a higher wear resistance. A method for preparing the composite is also provided. The method includes mixing the aluminum borate whiskers and the non-metallic material to (Continued)

form a mixture; and sintering the mixture by a vacuum hot press method, or molding the mixture.

3 Claims, 12 Drawing Sheets

(51) Int. Cl.
*C04B 35/645* (2006.01)
*C04B 35/80* (2006.01)
*C08J 3/20* (2006.01)
*C08J 5/04* (2006.01)

(52) U.S. Cl.
CPC .... *C04B 35/645* (2013.01); *C04B 2235/3217* (2013.01); *C04B 2235/3244* (2013.01); *C04B 2235/3409* (2013.01); *C04B 2235/3813* (2013.01); *C04B 2235/522* (2013.01); *C04B 2235/526* (2013.01); *C04B 2235/5264* (2013.01); *C04B 2235/5276* (2013.01); *C04B 2235/5436* (2013.01); *C04B 2235/6567* (2013.01); *C04B 2235/6581* (2013.01); *C04B 2235/77* (2013.01); *C04B 2235/786* (2013.01); *C04B 2235/96* (2013.01); *C08J 3/203* (2013.01); *C08J 5/0405* (2021.05); *C08J 2363/00* (2013.01)

(56) References Cited

FOREIGN PATENT DOCUMENTS

| | | | |
|---|---|---|---|
| CN | 112939582 A | | 6/2021 |
| KR | 100843747 B1 | * | 7/2008 |

* cited by examiner

ALUMINUM BORATE WHISKER REINFORCED AND TOUGHENED NON-METALLIC MATRIX COMPOSITE

CROSS REFERENCE TO RELATED APPLICATION

This patent application is a divisional application of U.S. patent application Ser. No. 17/847,386, filed Jun. 23, 2022, which claimed the benefit and priority of Chinese Patent Application No. 202110701385.4, filed on Jun. 23, 2021, the disclosures of which are incorporated by reference herein in their entireties.

TECHNICAL FIELD

The present disclosure is related to the field of reinforced and toughened non-metallic matrix composites and, in particular, to those composites reinforced with aluminum borate whisker.

BACKGROUND

Aluminum borate whiskers were firstly established by a Japanese scientist. They exhibit a very high Young's modulus and a high tensile strength and Mohs hardness. The aluminum borate whiskers, represented by general formula: $nAl_2O_3 \cdot B_2O_3$, come in a great molecular variety depending on the sintering temperature and production method therefor. Common examples are $9Al_2O_3 \cdot 2B_2O_3$, $Al_2O_3 \cdot B_2O_3$, and $2Al_2O_3 \cdot B_2O_3$. Among these, $9Al_2O_3 \cdot 2B_2O_3$ generally exhibits optimal properties. In particular, $9Al_2O_3 \cdot 2B_2O_3$ whiskers have a density of 2.93 g/cm$^3$ and a melting point of around 1450° C., and exhibit high hardness and strength. Also, they are insoluble in acidic and basic solutions. Furthermore, $9Al_2O_3 \cdot 2B_2O_3$ whiskers are cheap, and can be produced on an industrial scale. Alumina ceramics, as a non-metallic material, exhibit excellent properties including high hardness and strength and high resistances to heat, wear, and corrosion, and are thus often used in structural ceramics and wear-resistant products. However, alumina ceramics have inherent brittleness and low fracture toughness, which have limited their use by industry. The present disclosure provides an aluminum borate whisker reinforced and toughened composite based on a non-metallic material (including non-metallic inorganic materials and polymer organic materials) or an aluminum borate whisker reinforced and toughened non-metallic matrix composite that has not been presented in the prior art.

It would therefore be desirable to provide an aluminum borate whisker reinforced and toughened non-metallic matrix composite which exhibits a higher bending strength and fracture toughness and thus a higher wear resistance as compared to the known designs summarized above, as well as a preparation method thereof.

SUMMARY

These and other technical objects and problems are addressed by the embodiments provided in this invention. To this end, a first objective of the present disclosure is realized by an aluminum borate whisker reinforced and toughened non-metallic matrix composite, the composite comprising a non-metallic material reinforced and toughened with aluminum borate whiskers.

In an embodiment, the non-metallic material is a non-metallic inorganic material, a polymer organic material, or a mixture thereof.

In an embodiment, the composite comprises the aluminum borate whiskers in an amount of 1 to 50% by volume.

In an embodiment, the aluminum borate whiskers have a length of 1 to 50 μm and a diameter of 0.05 to 1.0 μm.

A second objective of the present disclosure is realized by a method for preparing an aluminum borate whisker reinforced and toughened non-metallic matrix composite, the method comprising steps of:
a) mixing aluminum borate whiskers and a non-metallic material to form a mixture; and
b) sintering the mixture by a vacuum hot press method when the non-metallic material is a non-metallic inorganic material, or molding the mixture when the non-metallic material is a polymer organic material.

In an embodiment where the non-metallic material is a non-metallic inorganic material, the method comprises: a) mixing aluminum borate whiskers and the non-metallic inorganic material by ball milling to form a mixture; and b) sintering the mixture by a vacuum hot press method at a temperature of 1300 to 1650° C. and at a pressure of 5 to 60 MPa for a period of time of 30 to 300 minutes.

In an embodiment where the non-metallic material is a polymer organic material, such as for example a resin, the method comprises: a) mixing aluminum borate whiskers and the polymer organic material by stirring to form a mixture; and b) molding the mixture at a temperature of 200 to 400° C. and at a pressure of 5 to 100 MPa for a period of time of 5 to 300 seconds.

Further, in the above embodiment where the non-metallic material is a non-metallic inorganic material, in step a), the aluminum borate whiskers and the non-metallic inorganic material are ball milled to a particle size of less than 1.0 km.

Further, in the above embodiment where the non-metallic material is a resin, in step a), the stirring is continued until a uniform mixture is obtained.

The present disclosure provides several advantages over the prior art. Aluminum borate whisker reinforcement and toughening improve the bending strength and fracture toughness of the non-metallic material. First, the whiskers may be melted to be in a liquid phase on heating during sintering. The liquid phase can penetrate between the grains to encapsulate them, and recrystallize during subsequent cooling, thus preventing grain growth and improving performance. Also, the liquid phase can flow to fill the pores in the system, leading to further densification. Second, a small amount of liquid phase recrystallizes to form whiskers that link the grains. Then, the whisker pull-out mechanism can enhance the strength of the system. Third, the liquid phase may be subjected to reduction by solid carbon (C) and partially gasified carbon from separator carbon paper, graphite mold and heater, and carbon felt, and may then react with $ZrO_2$ in the internal grain boundaries to form $ZrB_2$ which can toughen the matrix as well. Due to these three mechanisms, the addition of aluminum borate whiskers to the non-metallic material can result in a composite with substantially improved mechanical properties, especially wear resistance.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one of more embodiments of the invention and, together with the general description given above and the detailed description given below, explain the one or more embodiments of the invention.

DETAILED DESCRIPTION

Some embodiments of the present disclosure provide an aluminum borate whisker reinforced and toughened non-metallic matrix composite, such as for example an alumina ceramic matrix composite. The fracture strength of the composite largely depends on the largest grain or cluster size. The composite according to the present disclosure has been found to exhibit a higher fracture toughness due to the addition of the aluminum borate whiskers. In particular, the aluminum borate whiskers may be melted to be in a liquid phase on heating during sintering and may be forced to pass between the matrix grains and thereby remain on the surfaces thereof where they are to be recrystallized and needle-like crystals of whiskers of aluminum borate are thus to be formed again, and some of the whiskers may thereby be bridged leading to an increase in the fracture toughness. Crack deflection by the whiskers may also cause an increase in the fracture toughness. Aluminum borate whiskers, represented by general formula: $nAl_2O_3 \cdot B_2O_3$, come in a great molecular variety depending on the sintering temperature and production method therefor. Common examples are $9Al_2O_3 \cdot 2B_2O_3$, $Al_2O_3 \cdot B_2O_3$, and $2Al_2O_3 \cdot B_2O_3$. Among these, $9Al_2O_3 \cdot 2B_2O_3$ generally exhibits optimal properties. In particular, $9Al_2O_3 \cdot 2B_2O_3$ whiskers have a density of 2.93 g/cm$^3$ and a melting point of around 1450° C., and exhibit high hardness and strength. Also, they are insoluble in acidic and basic solutions. Furthermore, $9Al_2O_3 \cdot 2B_2O_3$ whiskers are cheap, and can be produced on an industrial scale. The wear resistance of ceramics is known to be closely related with the hardness and toughness thereof. The higher the strength and toughness, the higher the wear resistance. Alumina ceramics without aluminum borate whiskers exhibit high hardness but low toughness and poor wear resistance.

In a preferred embodiment, an alumina ceramic is used as the non-metallic inorganic material. In Preparation Examples of such an embodiment, $9Al_2O_3 \cdot 2B_2O_3$ whiskers were added in different amounts to an $Al_2O_3$—$TiB_2$ ceramic composite with a volume ratio of $Al_2O_3/TiB_2$=4:1, and were then sintered at a temperature higher than the melting point of the whiskers so that the whiskers may act as a flux and liquid-phase sintering may be realized.

The composites prepared in these examples included 0 to 30% by volume of the aluminum borate whiskers. It was found that the bending strength and density of the composite followed the trend of increasing and then decreasing with increasing whisker content, the fracture toughness of the composite followed the trend of increasing with increasing whisker content, and the wear resistance of the composite followed the trend of decreasing and then increasing with increasing whisker content.

Figure 1:
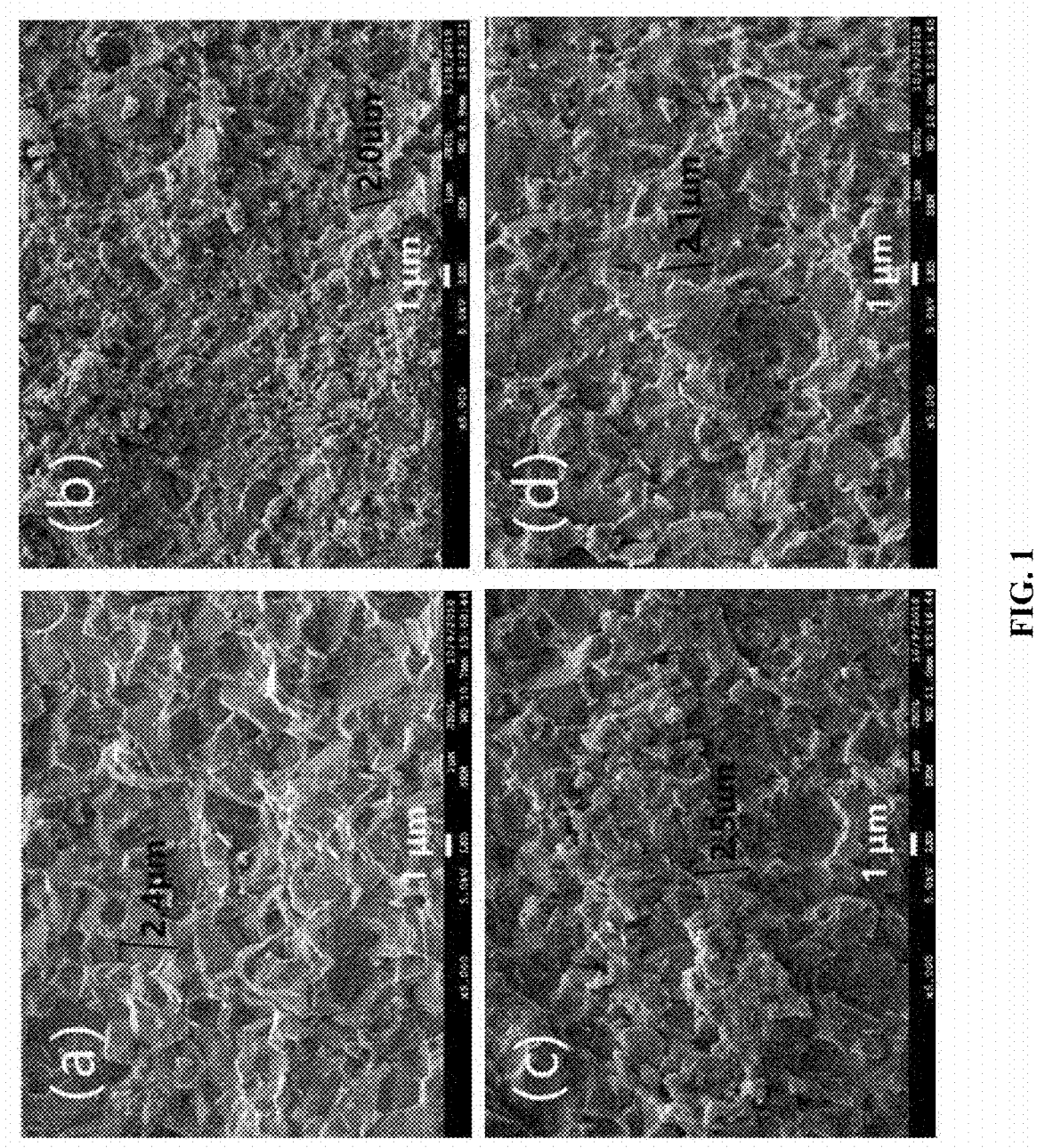
FIG. 1 shows several cross-sectional Scanning Electron Microscopy (SEM) images of the composites with different contents of the aluminum borate whiskers, according to the present disclosure.

FIG. 1 shows cross sectional SEM images of the composites prepared in the examples, including (a) 0%, (b) 10%, (c) 20%, and (d) 30% by volume of the aluminum borate whiskers. In any of the SEM images, the granular phase is $Al_2O_3$ and $TiB_2$, and the continuous phase is aluminum borate (i.e. $9Al_2O_3 \cdot 2B_2O_3$). The alumina particles are wrapped by the aluminum borate. This is because $9Al_2O_3 \cdot 2B_2O_3$ has a melting point of 1450° C., which is lower than the sintering temperature of 1500° C., and may undergo a phase change from solid to liquid on heating during sintering and then become a continuous solid phase again during subsequent cooling. So, the aluminum borate may function as a binding phase to bind the alumina particles together. The average grain size and largest grain size of the composite samples were measured by analyzing the photographed images using particle diameter distribution software. The composite sample shown in FIG. 1(*a*) was found to have an average grain size of 2.21 μm and a largest grain size of 2.4 μm. The sample shown in FIG. 1(*b*) was found to have an average grain size of 1.58 μm and a largest grain size of 2.0 μm. The sample shown in FIG. 1(*c*) was found to have an average grain size of 1.98 μm and a largest grain size of 2.5 μm. The sample shown in FIG. 1(*d*) was found to have an average grain size of 1.77 μm and a largest grain size of 2.1 μm. These results show that the composites with the aluminum borate whiskers had a smaller grain size than the composite without the whiskers. This is because the liquid phase formed during sintering inhibited particle growth due to direct particle-to-particle contact. Another possible reason is that the sintering temperature was reduced. These SEM images also show that the $Al_2O_3$ and $TiB_2$ particles of the composite with the aluminum borate whiskers had the same shape of an irregular polygon as that of those particles of the composite without the whiskers. This indicates that the $Al_2O_3$ and $TiB_2$ particles were less soluble in the liquid phase (i.e. aluminum borate) during sintering. Otherwise, these particles would present a pebble shape with rounded edges and corners.

Figure 2:
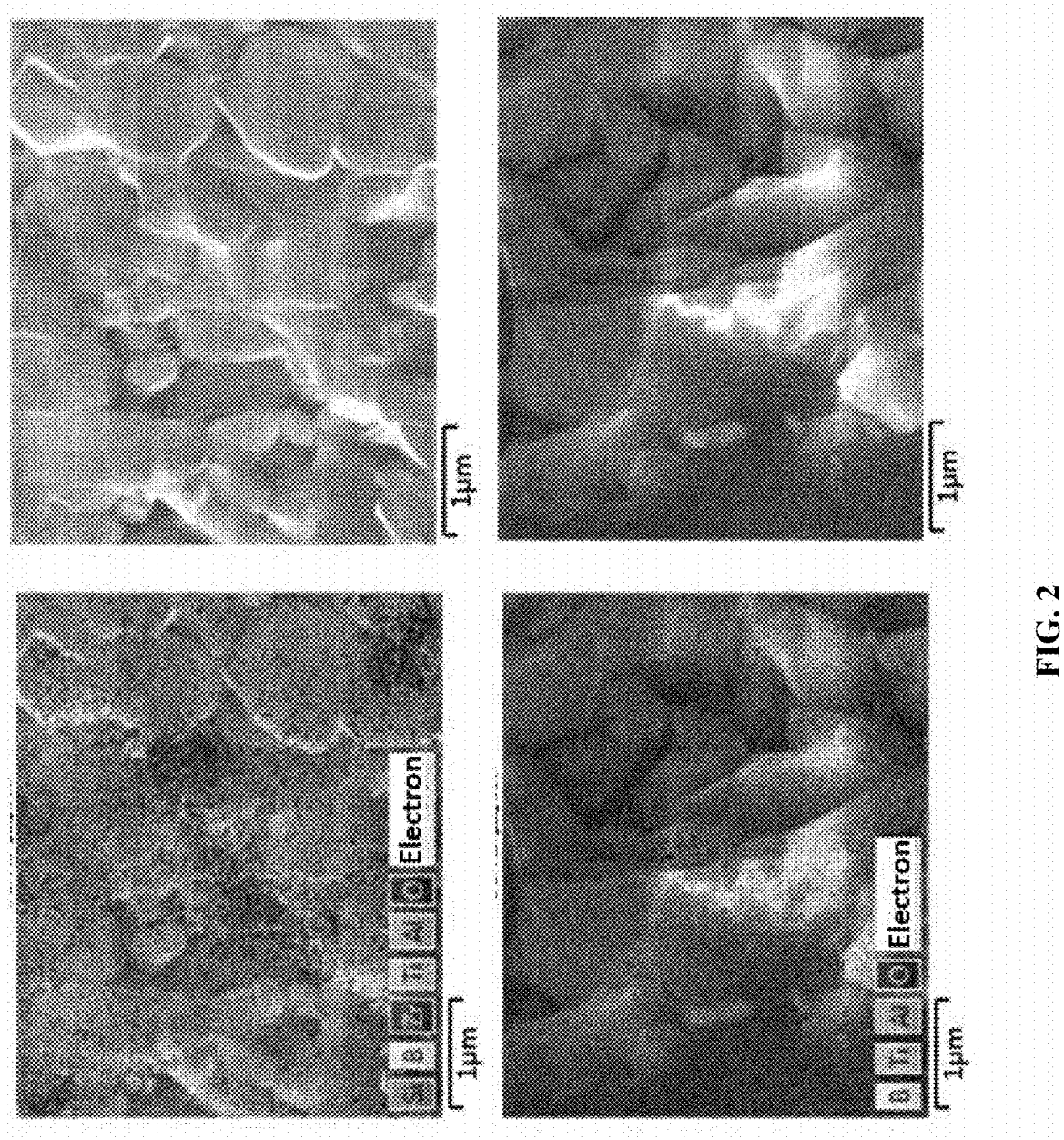
FIG. 2 shows Energy Dispersive Spectroscopy (EDS) element layered images (left) and SEM images (right) of the composite with 20% by volume of the whiskers from two selected areas.

FIG. 2 shows SEM and EDS element layered images of the composite including 20% by volume of the whiskers from two selected areas. It can be seen from these images that although the aluminum borate whiskers were melted during sintering, needle-like crystals of whiskers of aluminum borate were then formed again during subsequent cooling. It can be also seen from these images that some of the whiskers were bridged.

Figure 3:
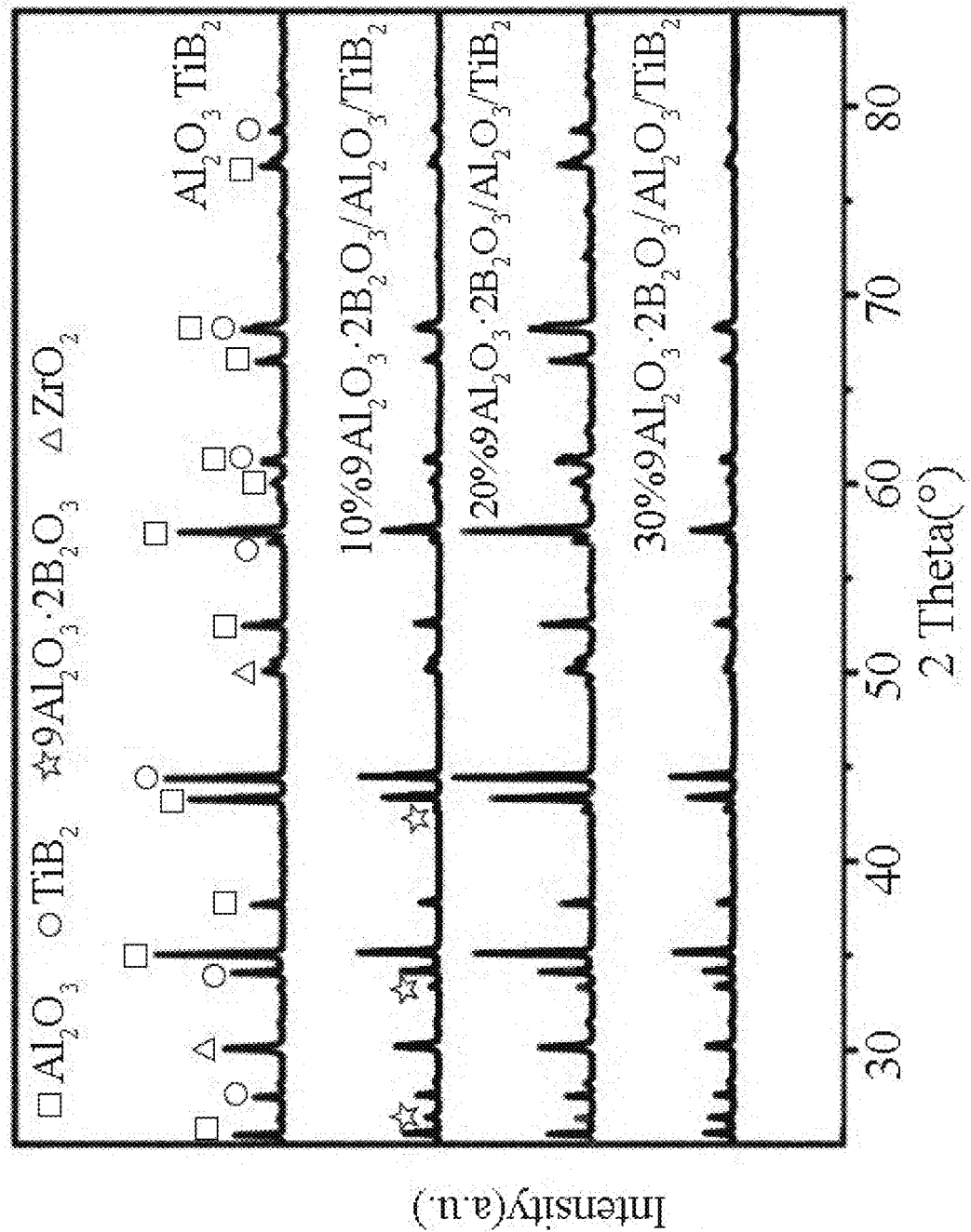
FIG. 3 shows X-ray Diffraction (XRD) patterns of the composites.
Figure 4:
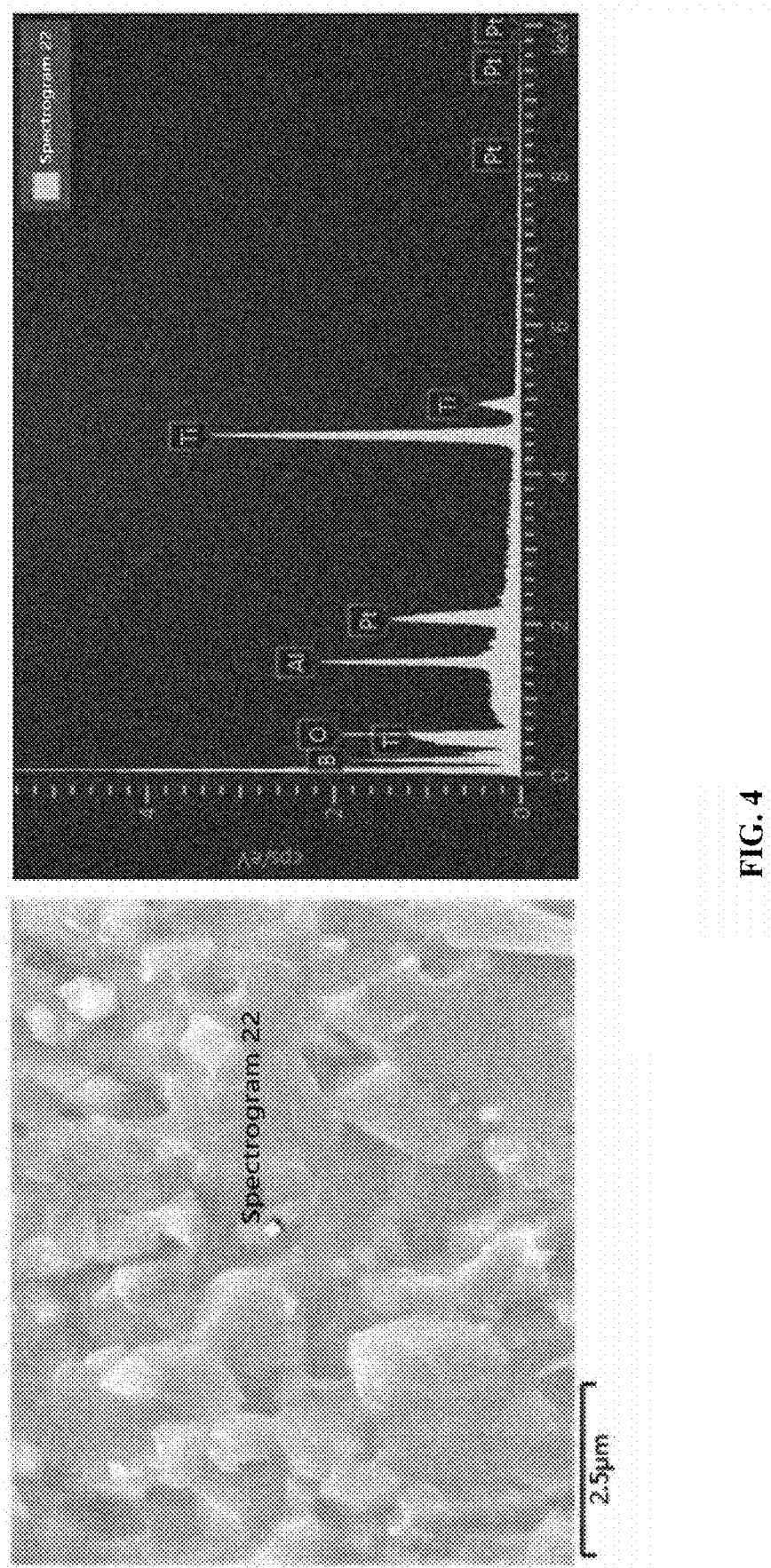
FIG. 4 shows a SEM image (left) and an EDS spectrum (right) of $9Al_2O_3 \cdot 2B_2O_3$ phase contained in the composite with 20% by volume of the whiskers.

FIG. 3 shows X-ray Diffraction (XRD) patterns of the composites prepared in the examples. These XRD patterns of the composites with the aluminum borate whiskers show the presence of $9Al_2O_3 \cdot 2B_2O_3$, $Al_2O_3$, and $TiB_2$ phases in all samples, indicating that there was no new phase formed during the sintering process. It can also be observed that the diffraction peak intensities first increased and then decreased as the content of the aluminum borate whiskers (i.e., $9Al_2O_3 \cdot 2B_2O_3$) increased, with the highest value obtained for the 20% sample. All the XRD patterns also show the presence of a $ZrO_2$ phase. It should be noted that the $ZrO_2$ phase should be an impurity phase because the $Al_2O_3$—$TiB_2$ ceramic and the $9Al_2O_3 \cdot 2B_2O_3$ whiskers were mixed and ball-milled by $ZrO_2$ balls and the debris generated due to wear of the balls may entry into the mixture. FIG. 4 shows a SEM image and EDS results of $9Al_2O_3 \cdot 2B_2O_3$ phase contained in the sample of the composite with 20% by volume of the aluminum borate whiskers. The EDS spectrum shows the presence of Pt element. This is because Pt spraying was used to enhance the electroconductivity of the sample. The EDS spectrum further shows the presence of Ti element, indicating that Ti from $TiB_2$ entered into the $9Al_2O_3 \cdot 2B_2O_3$ phase during sintering.

Figure 5:
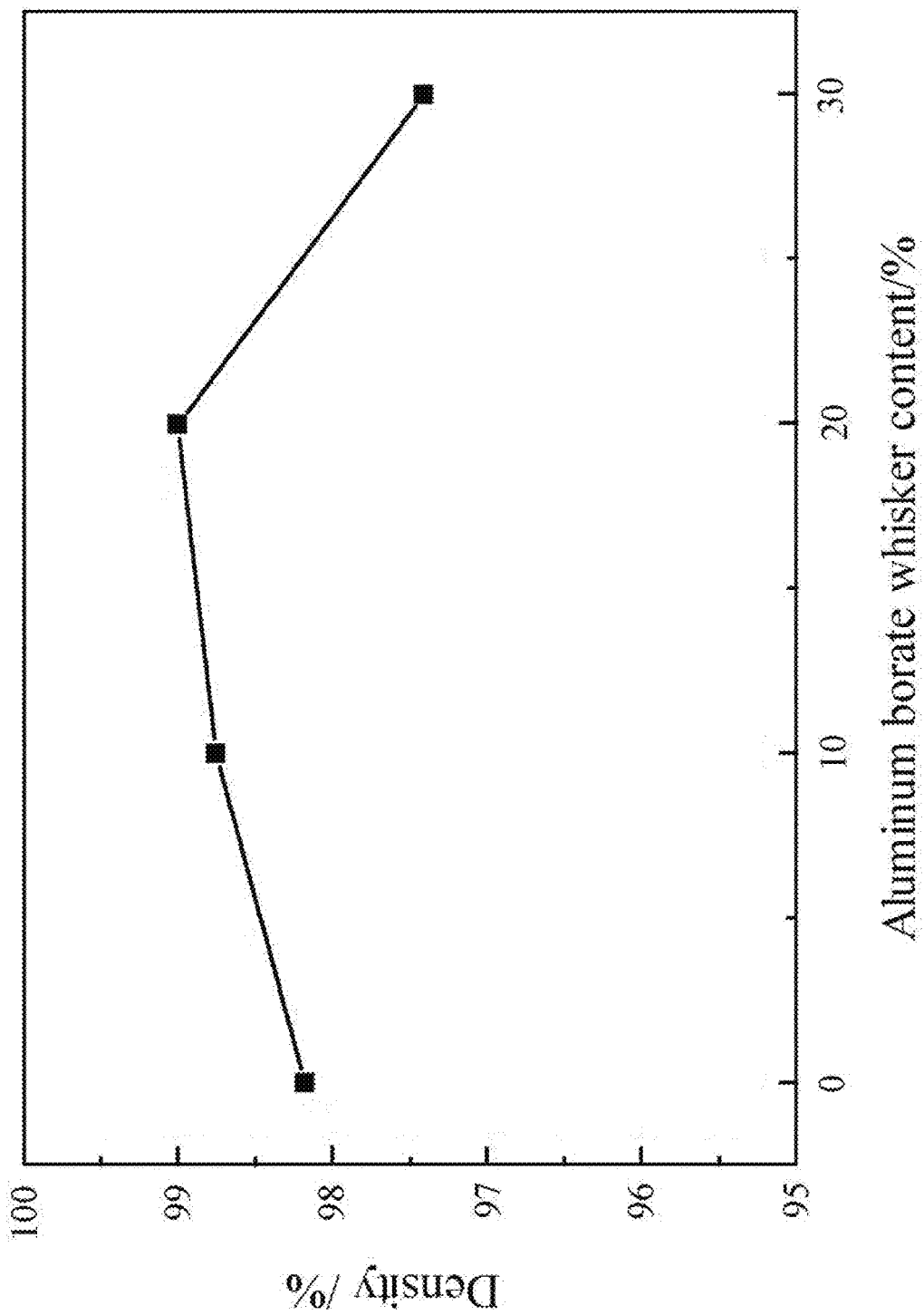
FIG. 5 shows the relative density (%) of the composites.

FIG. 5 shows that the relative density (%) of the composite according to the present disclosure increased and then decreased as the content of the aluminum borate whiskers increased, and reached its maximum value of 99.02% at the whisker content of 20%. As the whisker content increased from 20%, the relative density of the composite decreased at a faster rate. It was observed that the significant increase in the relative density was closely related to the liquefaction behavior of the aluminum borate whiskers during sintering. Typically, densification during liquid phase sintering (LPS) is divided into three distinctive stages: rearrangement, solution-precipitation, and solid phase bonding (or coalescence). During the rearrangement stage, the liquid phase may flow to fill the pores between solid particles, and the solid particles can be redistributed by viscous flow, leading to a close packing arrangement and an increased density of the system. During the solution-precipitation stage of LPS, small particles may dissolve and the solute species may precipitate on large particles, causing the particles to grow uniformly. Thereby, the particles may get closer to each other, leading to further densification. The densification process is mainly achieved through these three stages. The densification mechanism indicates that a large amount of the liquid phase may favor the densification. Turning now to the composite according to the present disclosure, as the content of the aluminum borate whiskers is increased, the volume ratio of a liquid phase thereof formed by heating the whiskers during sintering to the solid phase may be increased accordingly. During the whole sintering process, $Al_2O_3$ and $TiB_2$ particles exist in solid phase. During sintering, on heating, the aluminum borate whiskers may be melted to be in a liquid phase. The $Al_2O_3$ and $TiB_2$ solid particles may be rearranged therein. Subsequently, some diffusion between the particles and the liquid phase may occur. Lastly, during solidification of the liquid phase, coalescence of the particles may occur and thus a solid skeleton may be developed. Together, these three stages may make the density of the system substantially increased. It has been further found that, when the content of the aluminum borate whiskers in the composite according to the present disclosure is excessively high, there will be a too large volume of a liquid phase thereof during sintering, leading to generation of air pores and thus a reduced density. The results shown in FIG. 5 indicate that when the content of the aluminum borate whiskers was 20% by volume, the relative density of the composite reached 99.02%, indicating that the composite was substantially fully dense.

Figure 6:
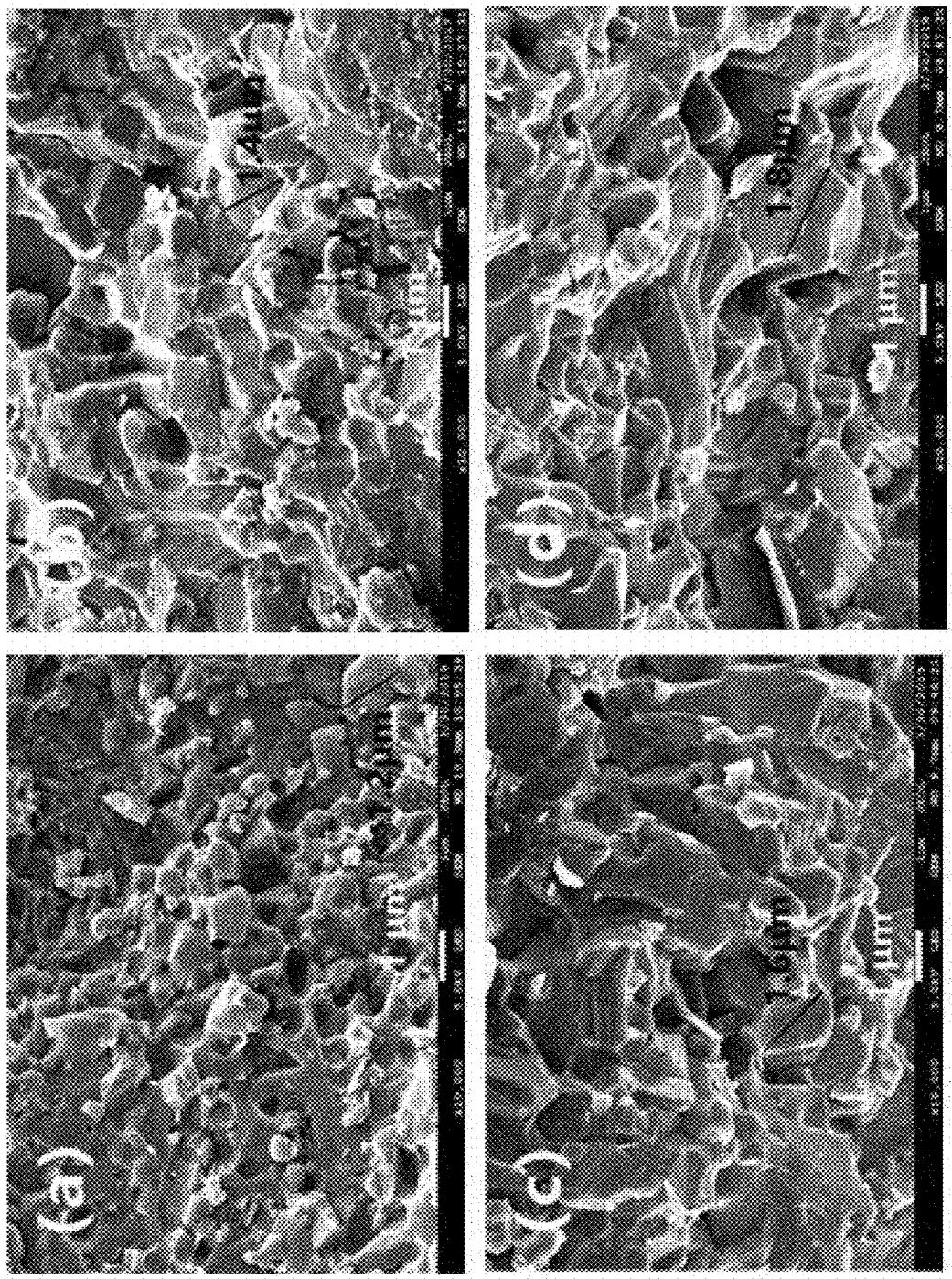
FIG. 6 shows SEM images of the aluminum borate whisker reinforced and toughened alumina ceramic matrix composites produced at a sintering temperature of (a) 1460° C., (b) 1480° C., (c) 1500° C., and (d) 1520° C.

FIG. 6 shows SEM images of aluminum borate whisker reinforced and toughened alumina ceramic matrix composites produced at different sintering temperatures, according to the present disclosure. As seen from these SEM images, the grain size of the ceramic phase followed an increasing trend with increasing sintering temperature. We think this is because a higher sintering temperature may lead to higher diffusion and mass transfer rates and a higher movability of the grain boundaries, and thus an increase in the size of the grains. The composite produced at a sintering temperature of 1460° C. had a non-uniform grain size, and had an average grain size of 0.95 μm and a largest grain size of 1.2 μm, see FIG. 6(a). This figure shows the presence of both large and small grains and also the presence of a number of pores. When the sintering temperature was increased to 1480 and 1500° C. (FIGS. 6(b) and 6(c), respectively), the composites were produced with a uniform grain size as well as an average grain size of 1.22 μm and a largest grain size of 1.4 and 1.6 μm respectively. In addition, a reduced number of pores were observed therein. When the sintering temperature was further increased to 1520° C., the composite was produced with an average grain size of 1.24 μm and a largest grain size of 1.8 μm which indicates the presence of excessively large grains, see FIG. 6(d). This is because a higher temperature may cause Ostwald ripening to proceed more rapidly. Ostwald ripening may cause small particles to be dissolved preferentially and precipitated on large particles, thereby leading to disappearance of the small particles and uniform growth of the solid particles. However, when the sintering temperature is too high, the Ostwald ripening process may proceed at a higher rate, leading to overgrowth of some solid particles. These SEM images also illustrate transition from intergranular fracture to transgranular fracture when the sintering temperature was increased. This is because at a lower sintering temperature, the bounding force between the grain surface and the reinforcing material present at the grain boundaries, was relatively weak, and thus intergranular fracture would dominate; while at a higher temperature, the bounding force therebetween was relatively strong, and thus transgranular fracture would then dominate.

Figure 7:
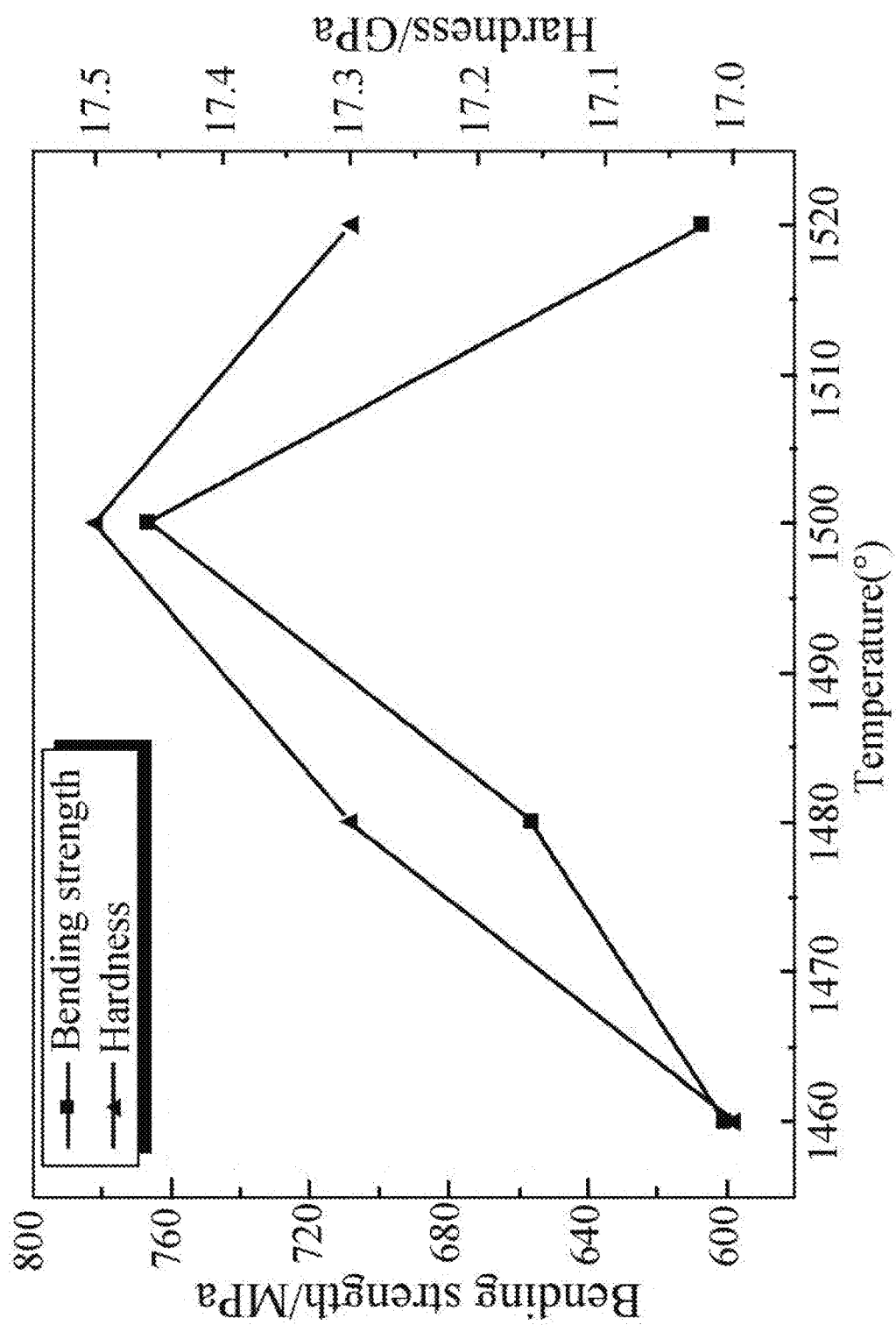
FIG. 7 shows bending strength and hardness of the composites produced at the different sintering temperatures.

It can be observed from FIG. 7 that the sintering temperature had a direct impact on the performance of the ceramic matrix composition. This is mainly because of the following reasons. First, a higher sintering temperature may lead to a larger cooling gradient and a thermal residual stress caused thereby may allow for more toughening, leading to a higher fracture toughness. Second, a higher sintering temperature may lead to an improved effect of solid solution strengthening and thus a higher fracture toughness. Third, generally, stress may be likely to be concentrated at sharp corners of ceramic grains, promoting crack propagation which goes against improving the fracture toughness. A higher sintering temperature may advantageously cause the edges and corners of the grains to be rounded due to the Ostwald ripening mechanism, favoring enhanced fracture toughness of the composite. Fourth, as the sintering temperature was further increased, the size of the grains may also be further increased so that the fracture toughness was disadvantageously reduced.

In an embodiment, the aluminum borate whiskers have a length of 1 to 50 μm and a diameter of 0.05 to 1.0 μm.

The present disclosure further provides a method for preparing an aluminum borate whisker reinforced and toughened non-metallic matrix composite. In a particular embodiment, the method comprises:
a) mixing the aluminum borate whiskers and a non-metallic material by ball milling to form a mixture; and
b) sintering the mixture by a vacuum hot press method.

The present inventors have found that the fracture toughness of the composite according to the present disclosure is substantially enhanced due to the addition of the aluminum borate whiskers. In particular, the whiskers may be melted to be in a liquid phase on heating during sintering and may be forced to pass between the matrix grains and thereby remain on the surfaces thereof where they are to be recrystallized and needle-like crystals of whiskers of aluminum borate are thus to be formed again, and some of the whiskers may thereby be bridged leading to an increase in the fracture toughness. The bridged whiskers may cause an increase in the fracture toughness, which indicates that the fracture toughness of the composite may be enhanced with increasing content of the aluminum borate whiskers. Crack deflection by the whiskers may also cause an increase in the fracture toughness. The wear resistance of the composite will be primarily affected by the strength, hardness, and toughness properties thereof. The present inventors have also found that the aluminum borate whiskers in the liquid phase may be reduced by solid carbon and partially gasified carbon from separator carbon paper, graphite mold and heater, and carbon felt, and then react with $ZrO_2$ in the internal grain boundaries to form $ZrB_2$ which can act to toughen the matrix. Liquid phase sintering occurs when a liquid phase is formed during the sintering process that coexists with solid particles at high temperature. Compared with solid phase sintering, liquid phase sintering can favor diffusion and mass transfer and thus lead to an increased density.

Figure 8:
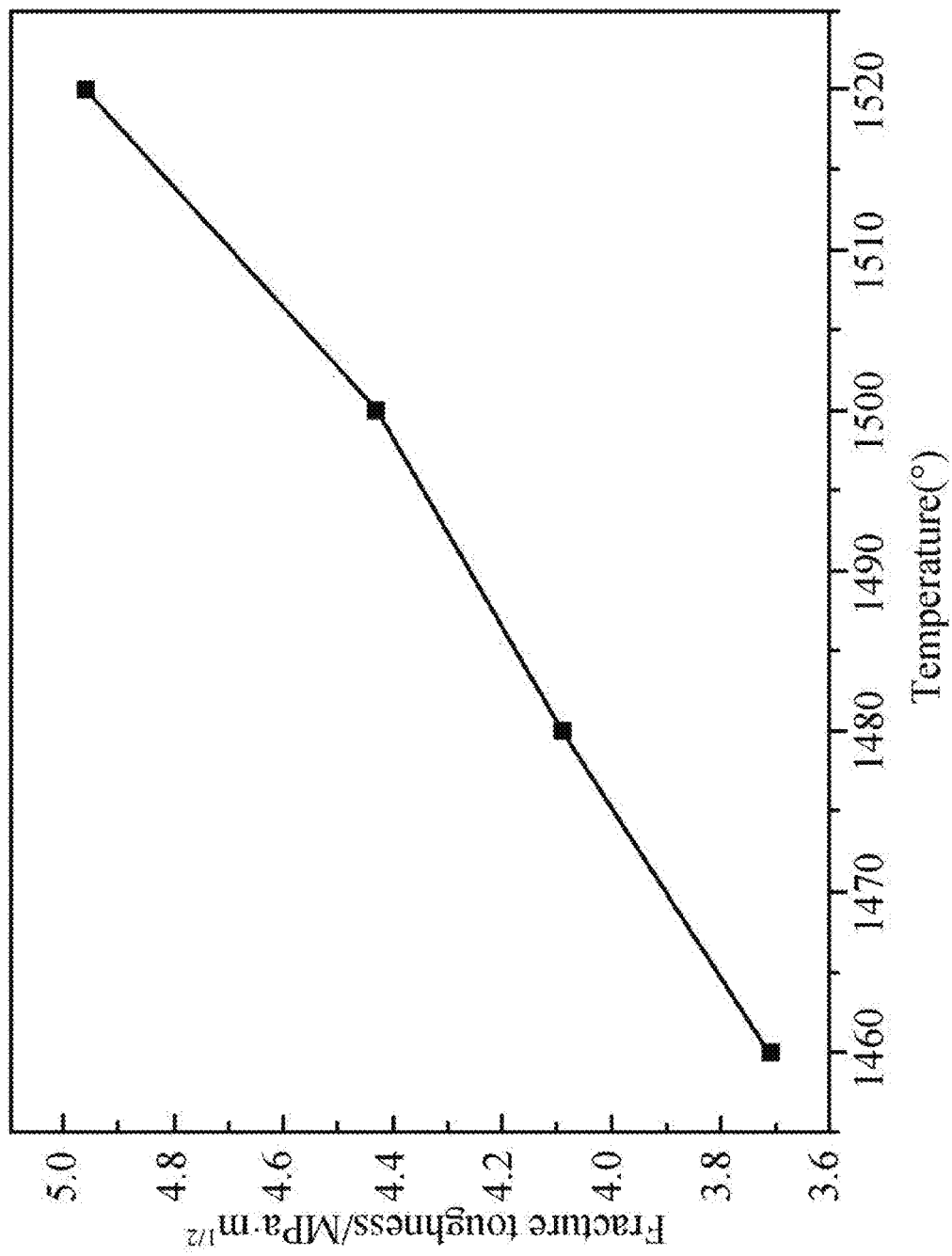
FIG. 8 shows fracture toughness of the composites produced at the different sintering temperatures.

In an embodiment, in step b), the mixture of the aluminum borate whiskers and the non-metallic material, obtained in step a), is sintered at a sintering temperature of 1460 to 1580° C. and at a pressure of 24 to 40 MPa for a period of time of 30 to 120 min. It was found that the bending strength and density of the alumina ceramic matrix composite followed the trend of increasing and then decreasing with increasing sintering temperature, and the fracture toughness of the composite followed the trend of increasing with increasing sintering temperature, as shown in FIGS. 7 and 8.

In an embodiment where the non-metallic material is an $Al_2O_3$—$TiB_2$ ceramic composite, in step a), the aluminum borate whiskers, alumina powder, and titanium diboride ($TiB_2$) are mixed and ball milled by zirconia ($ZrO_2$) balls in a ball mill pot to a particle size of less than 1.0 km.

A thermodynamic analysis showed that Gibbs free energy of the reduction reaction of $ZrO_2+9Al_2O_3 \cdot 2B_2O_3$ with carbon (C) to $ZrB_2$ is negative at a sintering temperature equal to or higher than 1545° C. This indicates that $ZrO_2$ is likely to be reduced with C in the presence of $9Al_2O_3 \cdot 2B_2O_3$ to $ZrB_2$ under such sintering conditions. During the high pressure, high temperature sintering, the powder material may be in a state having thermoplasticity, which may facilitate diffusion of the particles due to direct particle-to-particle contact and mass transfer thereof and thus reduce the sintering pressure, temperature, and time as well as accelerate the sintering process. On the other hand, the carbon monoxide (CO) gas generated during sintering may also facilitate the reduction reaction for producing $ZrB_2$.

Figure 9:
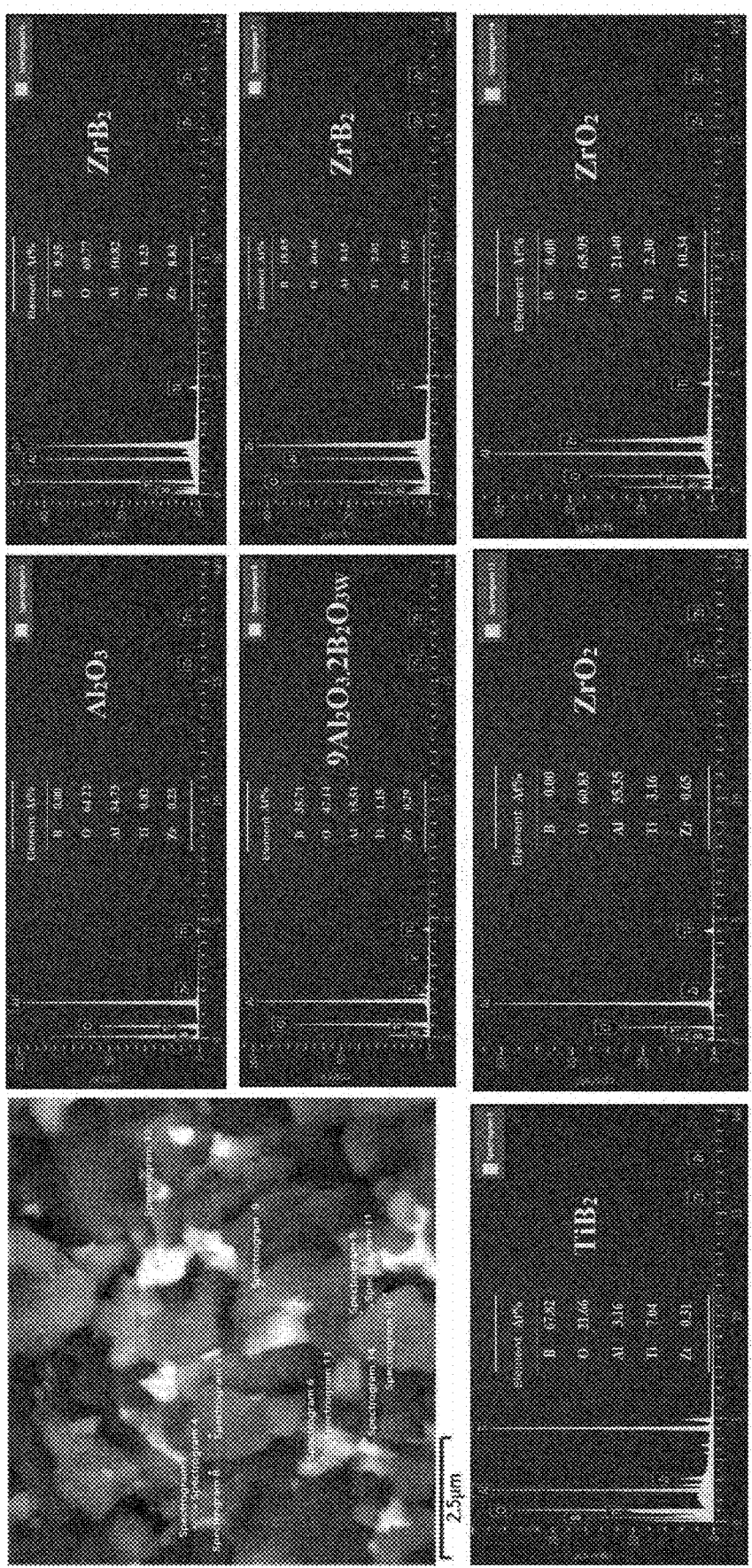
FIG. 9 shows a SEM image of the alumina ceramic matrix composite with 20% by volume of the aluminum borate whiskers and Electron backscatter diffraction (EBSD)+EDS spectra thereof corresponding to points 5, 6, 7, 8, 9, 13, and 14 in the SEM image.

To confirm this, an analysis of the alumina ceramic matrix composite comprising 20% by volume of the aluminum borate whiskers according to the present disclosure was carried out by SEM and EBSD+EDS analysis. The obtained images are shown in FIG. 9, where the dark gray particles represent an $Al_2O_3$ phase, the gray particles represent a $TiB_2$ phase, and the white particles represent a $ZrO_2$ phase. In addition, the black zones at the grain boundaries represent a $9Al_2O_3 \cdot 2B_2O_{3W}$ phase, which demonstrates that, during sintering, the $9Al_2O_3 \cdot 2B_2O_{3W}$ in the liquid phase may be diffused to the grain boundaries and recrystallized thereon such that the recrystallized grains may wrap the grains. Further, the light gray particles represent a $ZrB_2$ phase. A thermodynamic analysis showed that $Al_2O_3$ and $TiB_2$ cannot react with $ZrO_2$ under the present sintering conditions. That is the reason why the $ZrO_2$ grains were uniformly dispersed between the $Al_2O_3$ and $TiB_2$ grains as shown in FIG. 9. While $ZrB_2$ grains were observed in the edges of the $ZrO_2$ grains, demonstrating that, during sintering, the $9Al_2O_3 \cdot 2B_2O_{3W}$ in the liquid phase flowed to the grain boundaries and reacted with $ZrO_2$ to produce $ZrB_2$.

Figure 10:
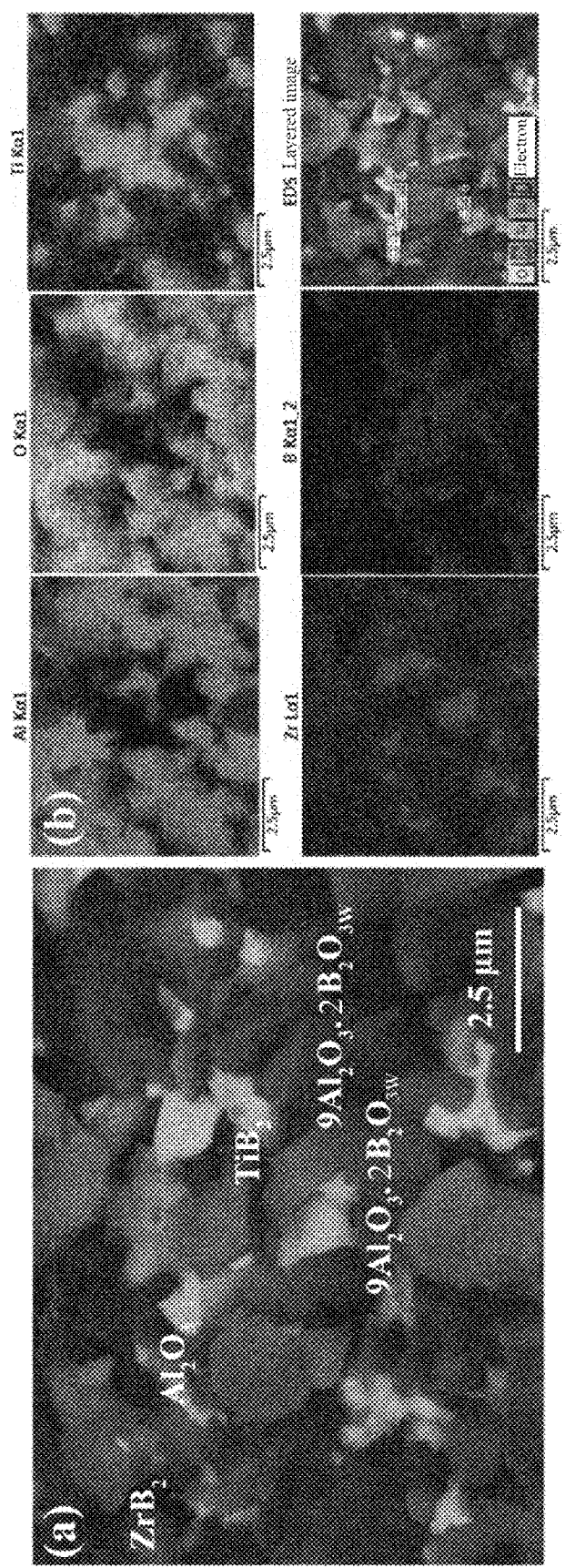
FIG. 10 shows at (a) a SEM+EBSD image of the alumina ceramic matrix composite with 20% by volume of the aluminum borate whiskers and at (b) EDS elemental mapping of the elements Al, O, Ti, Zr, B and total contained therein, as well as an EDS layered image.

Further, EDS surface scanning was carried out in order to figure out the distribution of the various elements in the system. The results are shown in FIG. 10. It can be observed from this figure that the Al, O, Ti, B, and Zr element distribution results were consistent with the EBSD analysis results. The $ZrB_2$ grains were evenly distributed in the edges of the $ZrO_2$ grains, which demonstrates that the $ZrO_2$ grain had been partially but not completely boronized due to diffusion limited. It should be noted that the grain boundaries contained a high concentration of the B element, which further demonstrates that the $9Al_2O_3 \cdot 2B_2O_{3W}$ in the liquid phase was indeed recrystallized at the grain boundaries.

Figure 11:
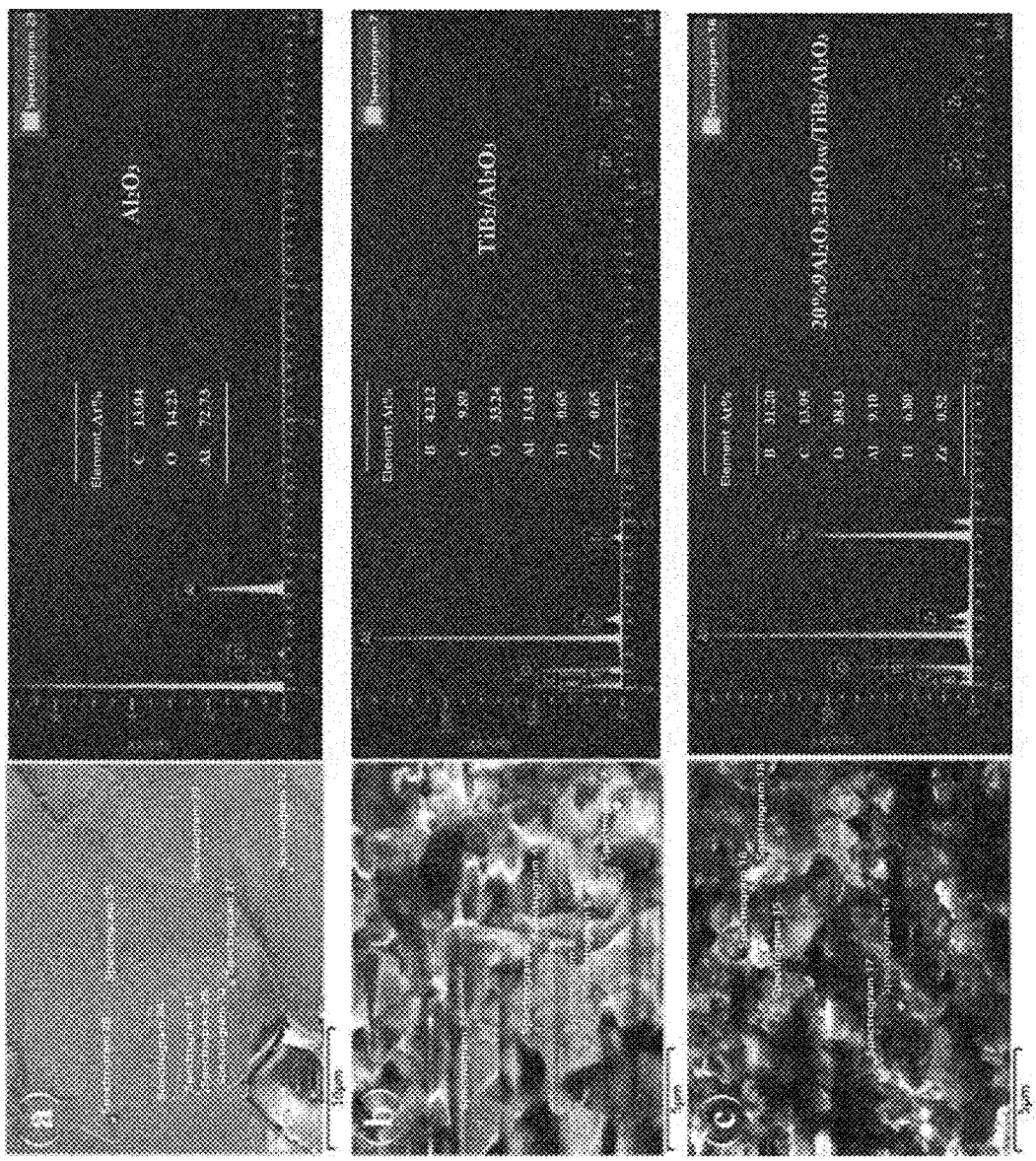
FIG. 11 shows SEM images (left) and EBSD+EDS spectra (right) of an edge region of cross-section of (a) pure $Al_2O_3$, (b) $TiB_2$—$Al_2O_3$, and (c) $9Al_2O_3 \cdot 2B_2O_{3W}$—$TiB_2$—$Al_2O_3$.
Figure 12:
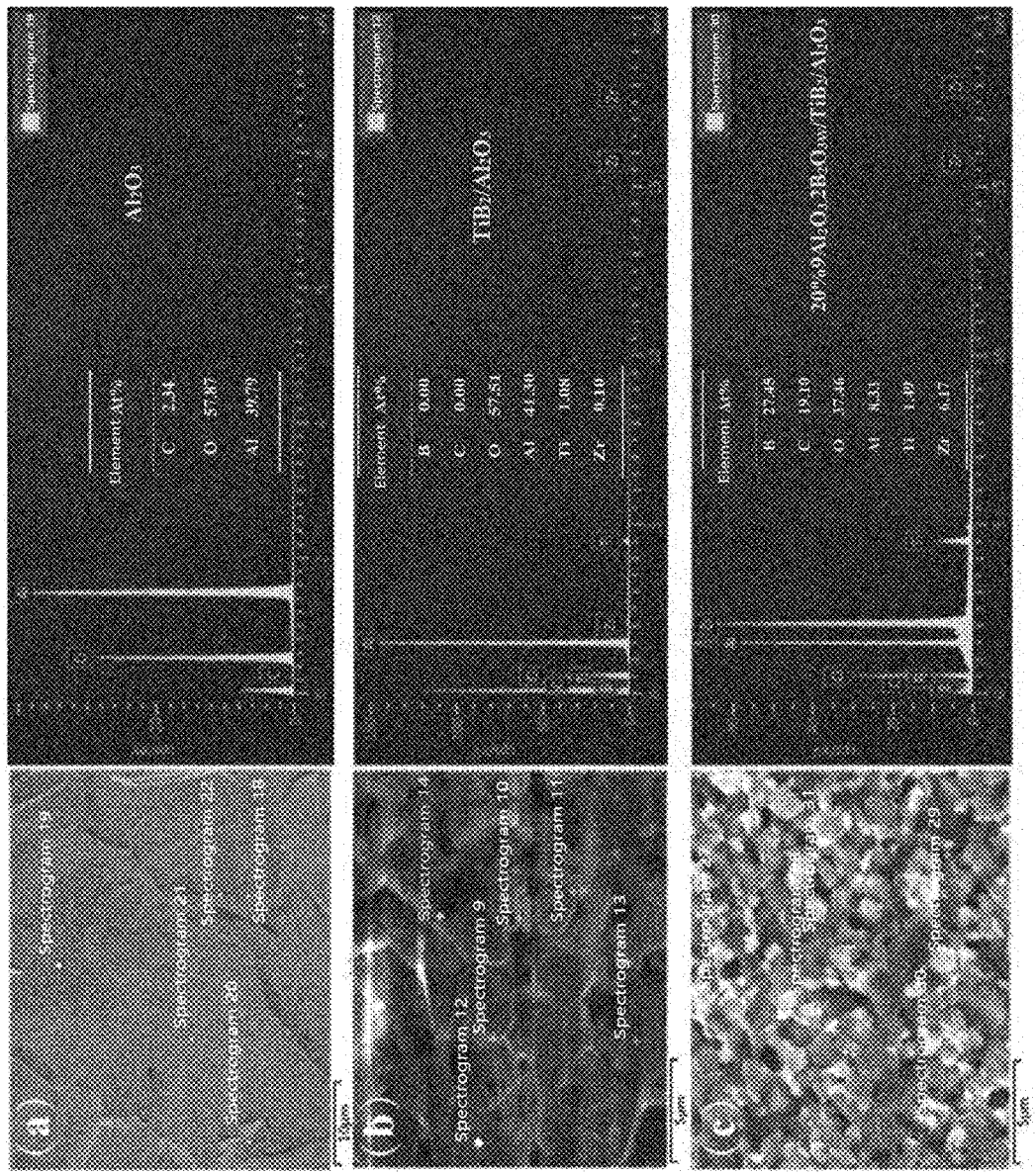
FIG. 12 shows SEM images (left) and EBSD+EDS spectra (right) of a center region of cross-section of (a) pure $Al_2O_3$, (b) $TiB_2$—$Al_2O_3$, and (c) $9Al_2O_3 \cdot 2B_2O_{3W}$—$TiB_2$—$Al_2O_3$.

Theoretical calculations have indicated that the reaction of $ZrB_2$ formation that occurs under the sintering conditions requires the presence of carbon. Solid carbon and/or partially gasified carbon from separator carbon paper, graphite mold and heater, and/or carbon felt may be used as the carbon source. To illustrate the effect of the C element, SEM and EBSD+EDS elemental analyses of an edge region and a center region of the cross-section of (a) pure $Al_2O_3$, (b) $TiB_2$—$Al_2O_3$, and (c) $9Al_2O_3 \cdot 2B_2O_{3W}$ (20% by volume)-$TiB_2$—$Al_2O_3$ were carried out and shown in FIGS. 11 and 12, respectively. It can be observed from FIGS. 11(a) and (b) and FIGS. 12(a) and (b) that there was a small amount of C in the edge region of $Al_2O_3$ and $TiB_2$—$Al_2O_3$ and there was almost no C in the center region of $Al_2O_3$ and $TiB_2$—$Al_2O_3$. These results indicate that during the sintering process carbon from carbon sources such as carbon paper and graphite mold entered the surfaces of the grains in the edge region of $Al_2O_3$ and $TiB_2$—$Al_2O_3$ due to solid phase diffusion and gaseous phase diffusion. However, the carbon was less likely to be diffused into the center region and to the grain boundaries therein due to the dense structure of the center region and the densification process that occurs during sintering. This is the reason why almost no carbon was observed in the center region of $Al_2O_3$ and $TiB_2$—$Al_2O_3$. By comparison, it can be observed from FIGS. 4, 11(c) and 12(c) that there was a high amount of carbon in both the edge region and the center region of $9Al_2O_3 \cdot 2B_2O_{3W}$ (20% by volume)-$TiB_2$—$Al_2O_3$. We think this is because the $Al_2O_3$ and $TiB_2$ grains exhibited a reduced stack density due to the loosely packed aluminum borate whiskers. These loosely packed whiskers may provide new diffusion paths of the carbon. In addition, during sintering, the whiskers were melted to be in a liquid phase, which exhibited a lower mass transfer resistance and thus a higher mass transfer rate and facilitated diffusion of the carbon to the grain boundaries in the center region of the ceramic phase. As a result, $9Al_2O_3 \cdot 2B_2O_3$ in a liquid phase, which had flowed to the grain boundaries, was reduced by the carbon to $AlB_2$, which was in turn reacted with $ZrO_2$ to form $ZrB_2$. It has been reported that $ZrB_2$ contains both covalent and metallic bonds and thus exhibits properties of both ceramics and metals, in particular, a high melting point, high hardness, high electrical and thermal conductivities, and resistance to molten steel. It is believed that when $ZrB_2$ is added as a secondary phase to a matrix of another ceramic, a ceramic composite with higher strength, toughness, and electrical conductivity can be realized. Therefore, the performances of the composite can be advantageously improved because of the formation of $ZrB_2$.

In summary, the aluminum borate whiskers can act to reinforce and toughen the matrix through three major mechanisms. First, the whiskers may be melted to be in a liquid phase on heating during sintering, and may flow to the grain boundaries, where they are to be recrystallized to wrap the grains leading to inhibition of grain growth. Also, the liquid phase may flow to fill the pores between the particles. These may lead to densification of the system. Second, the liquid phase may be forced to pass between the grains and remain on the surfaces thereof where they are to be recrystallized, resulting in formation of the whiskers thereon. In this way, the strength of the matrix can also be strengthened by the whisker pull-out. Third, the liquid may be reduced by solid carbon and/or partially gasified carbon from separator carbon paper, graphite mold and heater, and/or carbon felt, and then react with $ZrO_2$ at the internal grain boundaries to form $ZrB_2$ which can act to toughen the matrix. Due to these three mechanisms, the addition of aluminum borate whiskers to the alumina matrix ceramic can result in a composite with substantially enhanced toughness.

Example 1

An aluminum borate whisker reinforced and toughened alumina ceramic matrix composite was prepared, which contained 20% by volume of the whiskers. $9Al_2O_3 \cdot 2B_2O_3$ whiskers having a length of 5 μm and a diameter of 0.4 μm were used as the aluminum borate whiskers. An $Al_2O_3$—$TiB_2$ ceramic composite with a volume ratio of $Al_2O_3$/$TiB_2$=4:1 was used as the alumina ceramic.

The composite according to the present disclosure was prepared as follows.

The aluminum borate whiskers and the alumina ceramic were placed into a ball mill pot, and then mixed and ball milled by zirconia balls therein to a particle size of less than 1.0 μm.

The mixture was sintered by a vacuum hot press method at a sintering temperature of 1500° C. and at a pressure of 36 MPa for a period of time of 60 min.

Example 2

An aluminum borate whisker reinforced and toughened alumina ceramic matrix composite was prepared, which contained 30% by volume of the whiskers. $9Al_2O_3 \cdot 2B_2O_3$ whiskers having a length of 15 μm and a diameter of 1.0 μm were used as the aluminum borate whiskers. An $Al_2O_3$—$TiB_2$ ceramic composite was used as the alumina ceramic. The composite to be prepared further contained 56% by volume of $Al_2O_3$ and 14% by volume of $TiB_2$.

The composite according to the present disclosure was prepared as follows.

The aluminum borate whiskers and the alumina ceramic were placed into a ball mill pot, and then mixed and ball milled by zirconia balls therein to a particle size of less than 1.0 μm.

The mixture was sintered by a vacuum hot press method at a sintering temperature of 1380° C. and at a pressure of 5 MPa for a period of time of 30 min.

Example 3

An aluminum borate whisker reinforced and toughened alumina ceramic matrix composite was prepared, which contained 10 by volume of the whiskers. $9Al_2O_3 \cdot 2B_2O_3$ whiskers having a length of 10 μm and a diameter of 0.6 μm were used as the aluminum borate whiskers. An $Al_2O_3$—$TiB_2$ ceramic composite was used as the alumina ceramic. The composite to be prepared further contained 72% by volume of $Al_2O_3$ and 18% by volume of $TiB_2$.

The composite according to the present disclosure was prepared as follows.

The aluminum borate whiskers and the alumina ceramic were placed into a ball mill pot, and then mixed and ball milled by zirconia balls therein to a particle size of less than 1.0 μm.

The mixture was sintered by a vacuum hot press method at a sintering temperature of 1650° C. and at a pressure of 60 MPa for a period of time of 300 min.

Example 4

An aluminum borate whisker reinforced and toughened alumina ceramic matrix composite was prepared, which contained 20% by volume of the whiskers. $9Al_2O_3 \cdot 2B_2O_3$ whiskers having a length of 8 μm and a diameter of 0.8 μm were used as the aluminum borate whiskers. An $Al_2O_3$—$TiB_2$ ceramic composite was used as the alumina ceramic. The composite to be prepared further contained 64% by volume of $Al_2O_3$ and 16% by volume of $TiB_2$.

The composite according to the present disclosure was prepared as follows.

The aluminum borate whiskers and the alumina ceramic were placed into a ball mill pot, and then mixed and ball milled by zirconia balls therein to a particle size of less than 1.0 μm.

The mixture was sintered by a vacuum hot press method at a sintering temperature of 1580° C. and at a pressure of 36 MPa for a period of time of 60 min.

Example 5

An aluminum borate whisker reinforced and toughened alumina ceramic matrix composite was prepared, which contained 30% by volume of the whiskers. $9Al_2O_3 \cdot 2B_2O_3$ whiskers having a length of 12 μm and a diameter of 0.6 μm were used as the aluminum borate whiskers. An $Al_2O_3$—$TiB_2$ ceramic composite was used as the alumina ceramic. The composite to be prepared further contained 56% by volume of $Al_2O_3$ and 14% by volume of $TiB_2$.

The composite according to the present disclosure was prepared as follows.

The aluminum borate whiskers and the alumina ceramic were placed into a ball mill pot, and then mixed and ball milled by zirconia balls therein to a particle size of less than 1.0 μm.

The mixture was sintered by a vacuum hot press method at a sintering temperature of 1460° C. and at a pressure of 30 MPa for a period of time of 120 min.

Example 6

An aluminum borate whisker reinforced and toughened resin matrix composite was prepared, which contained 30% by volume of the whiskers. $9Al_2O_3 \cdot 2B_2O_3$ whiskers having a length of 20 μm and a diameter of 0.8 μm were used as the aluminum borate whiskers. An epoxy resin was used as the resin.

The composite according to the present disclosure was prepared as follows.

The aluminum borate whiskers and the epoxy resin were mixed by stirring.

The mixture was molded at a temperature of 200° C. and at a pressure of 5 MPa for a period of time of 5 seconds.

Example 7

An aluminum borate whisker reinforced and toughened resin matrix composite was prepared, which contained 30% by volume of the whiskers. $9Al_2O_3 \cdot 2B_2O_3$ whiskers having a length of 8 μm and a diameter of 0.08 μm were used as the aluminum borate whiskers. An epoxy resin was used as the resin.

The composite according to the present disclosure was prepared as follows.

The aluminum borate whiskers and the epoxy resin were mixed by stirring.

The mixture was molded at a temperature of 400° C. and at a pressure of 100 MPa for a period of time of 300 seconds.

Example 8

An aluminum borate whisker reinforced and toughened resin matrix composite was prepared, which contained 30% by volume of the whiskers. $9Al_2O_3 \cdot 2B_2O_3$ whiskers having a length of 40 μm and a diameter of 0.36 μm were used as the aluminum borate whiskers. An epoxy resin was used as the resin.

The composite according to the present disclosure was prepared as follows.

The aluminum borate whiskers and the epoxy resin were mixed by stirring.

The mixture was molded at a temperature of 300° C. and at a pressure of 60 MPa for a period of time of 150 seconds.

The embodiments described above are only descriptions of preferred embodiments of the present invention, and are not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:

1. An aluminum borate whisker reinforced and toughened non-metallic matrix composite, consisting of:
    a non-metallic material reinforced and toughened with aluminum borate whiskers;
    wherein the non-metallic material is an $Al_2O_3$—$TiB_2$ ceramic composite with a volume ratio of $Al_2O_3$ to $TiB_2$=4:1 and having a granular $Al_2O_3$ phase, a granular $TiB_2$ phase, an optional $ZrO_2$ phase, and an optional $ZrB_2$ phase;
    the aluminum borate whiskers is defined by a continuous $9Al_2O_3$-$2B_2O_3$ phase;
    the aluminum borate whiskers account for 10 to 20% by volume of the aluminum borate whisker reinforced and toughened non-metallic matrix composite;
    and
    wherein the granular $Al_2O_3$ phase is wrapped by the continuous $9Al_2O_3$-$2B_2O_3$ phase during sintering, and the continuous $9Al_2O_3$-$2B_2O_3$ phase is formed in whiskers on a surface of the granular $Al_2O_3$ phase after cooling to solidification.

2. The composite of claim 1, wherein the aluminum borate whiskers each have a length of 1 to 50 μm and a diameter of 0.05 to 1.0 μm.

3. The composite of claim 1, wherein the ZrO2 phase and ZrB2 phase are present and are an impurity phase derived from mixing and ball milling the other phases together using $ZrO_2$ balls before sintering.

* * * * *